United States Patent [19]
Lada et al.

[11] 3,803,885
[45] Apr. 16, 1974

[54] CONTROL OF ALGAE IN INDUSTRIAL WATER
[75] Inventors: Arnold Lada, Montclair; Alfonso N. Petrocci, Glen Rock; John J. Merianos, Jersey City, all of N.J.
[73] Assignee: Millmaster Onyx Corporation, New York, N.Y.
[22] Filed: Sept. 14, 1971
[21] Appl. No.: 180,499

Related U.S. Application Data
[63] Continuation-in-part of Ser. No. 861,172, Sept. 25, 1969, abandoned.

[52] U.S. Cl..................... 71/67, 162/161, 424/333
[51] Int. Cl............................................ A01n 9/24
[58] Field of Search.......... 71/67; 424/333; 162/161

[56] References Cited
UNITED STATES PATENTS
3,269,942  8/1966  Wilks..................................... 71/67
3,300,373  1/1967  Wolfson............................. 162/161

OTHER PUBLICATIONS
Alfonso, et al. Chem Abst. Vol. 46 (1952) 9166c
Tago, et al. Chem Abst. Vol. 53 (1959) 20237f
Ishida et al. Chem Abst. Vol. 54 (1960) 22844d Primary Examiner—Lewis Gotts
Assistant Examiner—Catherine L. Mills
Attorney, Agent, or Firm—Arthur A. Jacobs, Esq.

[57] ABSTRACT

Slimicidal treatment of water in recirculated water systems such as in cooling towers, air-conditioners, humidifiers and the like. The treatment consists of the introduction into the water of an $\alpha$-halo, $\alpha$, $\beta$-unsaturated carbonyl compound, particularly of $\alpha$-halocinnamaldehyde.

3 Claims, No Drawings

CONTROL OF ALGAE IN INDUSTRIAL WATER

This is a continuation-in-part of application Ser. No. 861,172, filed Sept. 25, 1969, now abandoned.

This invention relates to slimicidal treatment of water. It particularly relates to a treatment for controlling the proliferation of microorganisms in coolant, conditioning and process waters which would result in formation of slime.

One object of the present invention is to prevent or limit the growth of microorganisms causing slime in recirculated water, as for example, in cooling towers, air-conditioners, humidifiers and the like. Another object of the invention is to prevent microbial growth causing slime in process water, as for example, in paper manufacture.

In accordance with the present invention, the above objects are achieved by the introduction into the water of $\alpha$-halo, $\alpha$, $\beta$-unsaturated carbonyl compounds, and particularly of $\alpha$-bromocinnamaldehyde. In most cases, however, the corresponding $\alpha$-chloro compounds may be substituted. Compounds of this type have the general formula:

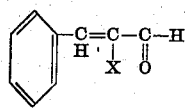

wherein X is a halogen such as chlorine or bromine.

A water cooling tower is biologically comparable to an activated sludge system, with an aerobic and anaerobic phase, and with floc formation. The latter is of particular concern since bacteriological floc may be transported to heat exchangers in which it may cause serious problems by impairing heat exchange. A bacteriological floc consists of microorganisms such as bacteria, algae and fungi, along with chemical crystalline matter and amorphous organic matter. The ratio therein of surface to chemical concentration is high and this is readily conductive to the growth of microorganisms.

Among the slime-causing organisms which proliferate in towers are algae, and especially the filamentous blue-green algae which are particularly hard to control. They create a great problem, especially in the upper sections of a tower where sunlight is available. Other types of noxious organisms are *Fungi Imperfecti*, such as *Penicillia* and *Aspergillia*, which cause soft-rot of the wooden structural members of the tower, and the higher fungi or *Basidomycete*, which attack cellulose to cause white-rot and attack lignin to cause brown-rot. These are problems in cooling tower process water, as are also those bacteria which multiply to form floc, as, for example, *Pseudomonas, Flavobacter, Achromobacter, Coliforms, Xanthomonas, Ferribacterium, Sphaerotilis,* and *Bacilli*.

The organisms causing slimes and other troubles in water used for paper manufacture are at least as numerous and varied as those in cooling water, and are the cause of souring, staining and general reduction of the quality of the paper made from pulp. The economic loss caused by slime may be as much as $5.00 per ton of pulp.

Slimes are, generally not composed of any one organism but of mixtures of organisms. Such mixtures generally include algae, fungi and bacteria. The selection of a chemical inhibitor is, therefore, quite difficult, and ordinary biocides are usually found to be ineffective.

The importance of preventive treatment of water is of the highest importance, since it has been found that large masses of slime, once formed, must be removed from heat exchanger tubes and the like before chemical agents can be effective.

Biocides for use in the above applications must have a broad spectrum in order to adequately inhibit the wide range of slime-causing organisms, and should be water soluble to a degree requisite for their operation. Generally, they should also be non-foaming, active at pH 6 to 8, and compatible with halogens such as chlorine as well as with corrosion inhibitors. They should also be compatible with the components which are usually present in hard water in order not to precipitate scaling in heat exchangers. All of these properties are processed by the $\alpha$-halocinnamaldehydes of this invention.

The $\alpha$-halocinnamaldehydes used for water treatment, according to this invention, may be synthesized by methods known to the art; for example, by the Claissen-Schmidt condensation of benzaldehyde with acetaldehyde, followed by halogenation and subsequent de-hydrohalogenation, to yield $\alpha$-halocinnamaldehyde.

The $\alpha$-halocinnamaldehydes, in pure form, are prepared by commercial methods. The compound $\alpha$-bromocinnamaldehyde, for example, is produced as cream-colored to tan crystals, 98 percent–100 percent active, and melting at 69°–72°C. These methods, which are well-known to those skilled in the art, provide for the condensation of benzaldehyde with acetaldehyde. Thereafter, the resulting cinnamaldehyde may be halogenated, in the course of which process two halogen atoms add at the double bond. On treatment with a mild alkali, one halohydrogen is split off, leaving the desired compound, namely an $\alpha$-halocinnamaldehyde. This is illustrated in the following Example 1.

The amount of $\alpha$-halocinnamaldehyde may vary from about 1 to 500 parts per million of water being treated.

EXAMPLE 1

A mixture of 44 g. (0.33 mol) of cinnamic aldehyde and 167 ml. of acetic acid is placed in a 500 ml. three-necked round-bottomed flask, surrounded by a cold-water bath and fitted with a stirrer, reflux condenser, and dropping funnel, and is stirred vigorously while 17.1 ml. (53.5 g., 0.33 mol) of bromine is added. This is followed by the addition of 23 g. (0.17 mol) of anhydrous potassium carbonate. When the evolution of gas has ceased, the mixture is refluxed for 30 minutes, and is then cooled and poured into 435 ml. of water in a 1-l. flask. A lower, reddish layer of crude $\alpha$-bromoaldehyde separates.

The flask is stoppered, cooled under running water and shaken vigorously. The resulting granular solid is filtered with suction, and dissolved, without drying, by warming with 220 ml. of 95 percent ethanol. After the addition of 50 ml. of water, the solution is warmed until it becomes clear, and is then set aside to crystallize at room temperature, and finally in a refrigerator. The product, $\alpha$-bromocinnamic aldehyde, separates as nearly colorless needles, which are filtered with suction, rinsed with 17 ml. of 80 percent ethanol, and air-dried. The yield of product melting at 72°–73° is 52–60 g. (75–85 percent).

The same procedure may be used to produce α-chlorocinnamaldehyde except for the substitution of an equivalent amount of chlorine for the bromine.

A 1 percent by weight solution of the product of Example 1, in a mixture of acetone 70 percent and water 30 percent, was tested for antimicrobial activity using the "Standard Tube Dilution Test." This test, which is common knowledge to those skilled in the art, utilizes a nutrient broth which is treated to provide various concentrations of the experimental antimicrobial candidates; following which the treated nutrient is inoculated with an appropriate nutrient broth suspension of the test bacteria, fungi, or algae. The bacterial tubes are incubated at 37°C. and observed for macroscopic growth after 48 hours. The fungi or algae tubes are incubated at 28°C. and observed for macroscopic growth after 14 days. For convenience, the sterile nutrient broth is contained in a test tube at 9 ml. volume, to which 1.0 ml. of test antimicrobial solution is added, and it is subsequently inoculated with 0.1 ml. of a broth suspension of the test microorganisms. The lowest concentration of experimental anti-microbial compound in broth which does not permit macroscopic growth of the test microorganisms is considered to be the minimum Inhibitory Level of the compound for the specific bacteria, fungi, or algae. For a wide range of applications, the inhibition of growth rather than the outright kill of the microorganisms is satisfactory.

Table 1

α-bromocinnamaldehyde

| Organism | Static dilution level, p.p.m. |
| --- | --- |
| Gram Negative | |
| Escherichia coli | 10 |
| pseudomonas aeruginosa | 100 |
| Gram Positive | |
| Staphylococcus aureus | 50 |
| Streptococcus faecalis | 500 |
| Fungi | |
| Aspergillus niger | 50 |
| Penicillium expansum | 10 |
| Algae | |
| Chlorella pyrenoidosa | 1 |

Test solutions of α-bromocinnamaldehyde were prepared at concentrations of 5 to 10 parts per million respectively, in sterile distilled water. These were inoculated with a 24-hour broth culture of *Aerobacter aeruginosa* diluted in broth to provide from 1 to 2 million cells per ml of test solution. They were incubated at 37°C. for periods of 3 hours and 24 hours, and the surviving bacteria were plated in TGE agar. The count was as follows:

Table 2

α-bromocinnamaldehyde vs. Aerobacter aeruginosa

| | Organisms Surviving After | |
| --- | --- | --- |
| p.p.m. α-Br C | 3 hours | 24 hours |
| 5 | 800,000 | 10 |
| 10 | 870,000 | 10 |

The invention claimed is:

1. A method of preventing the proliferation of algae in industrial water which comprises applying to said algae in said water about 1 to 500 parts per million parts of water of a compound having the formula:

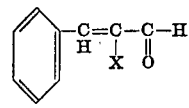

wherein X is either chlorine or bromine.

2. The method of claim 1 wherein the compound is α-halocinnamaldehyde.

3. The method of claim 1 wherein the compound is α-bromocinnamaldehyde.

* * * * *